US005288403A

United States Patent [19]

Ohno

[11] Patent Number: 5,288,403

[45] Date of Patent: Feb. 22, 1994

[54] FILTER FOR REMOVING LEUCOCYTES

[75] Inventor: Shinji Ohno, Ohtsu, Japan

[73] Assignee: Nissoh Corporation, Osaka, Japan

[21] Appl. No.: 21,574

[22] Filed: Feb. 24, 1993

[30] Foreign Application Priority Data

Feb. 28, 1992 [JP] Japan .................................. 4-079379

[51] Int. Cl.[5] ........................ B01D 39/08; B01D 39/16

[52] U.S. Cl. .................................... 210/508; 210/504; 210/505; 428/395

[58] Field of Search ............... 210/503, 505, 504, 506, 210/508; 526/238.23; 536/116; 428/365, 378, 395

[56] References Cited

U.S. PATENT DOCUMENTS 4,701,267 10/1987 Watanabe et al. .................. 210/505
5,152,905 10/1992 Pall et al. ............................ 210/505
5,164,492 11/1992 Kitazawa et al. ................... 536/116

FOREIGN PATENT DOCUMENTS 0394496 10/1990 European Pat. Off. .
3-188870 8/1991 Japan .
WO-A-9104088 4/1991 PCT Int'l Appl. .
2246713 2/1992 United Kingdom .

*Primary Examiner*—Robert A. Dawson
*Assistant Examiner*—Sun Uk Kim
*Attorney, Agent, or Firm*—Armstrong, Westerman, Hattori, McLeland, & Naughton

[57] ABSTRACT

A filter for removing leucocytes comprising a filter medium, said filter medium being a fibrous material made of a polyester fiber which is treated on its surface with a copolymer containing 40 to 80% by weight of units derived from glucosyloxyethyl methacylate.

When the filter of the present invention is used, leucocytes are removed from concentrated platelets or platelet-rich plasma without loss of platelets.

3 Claims, No Drawings

FILTER FOR REMOVING LEUCOCYTES

BACKGROUND OF THE INVENTION

The present invention relates to a filter for removing leucocytes from concentrated platelets or platelet-rich plasma.

Platelet transfusion is effective for bleeding patients who show severe sympton due to thrombocytopenia or thrombocytosis. Recently large amount of chemotherapeutics have been used for a treatment of a malignant tumor or a blood dyscrasia and the patients have shown thrombocytopenia after chemotherapies. Therefore platelet transfusions increase in the clinical cases. The patients who produced alloantibodies against HLA antigen show a transfusion reaction by leukocytes intermixed. In such case, the patients can not be administered with the general platelet transfusion but can be administered with HLA compatible platelet transfusion. However, HLA compatible platelet transfusion is not generally conducted because HLA type does not easily match. So, removal of leucocytes is the most effective method to prevent the transfusion reaction.

As a method for removing leucocytes from concentrated platelets or platelet-rich plasma, there are known following methods.

(1) A method wherein a platelet layer is obtained from a buffy coat layer by centrifugal separation for separating blood components.

(2) A method wherein a bag containing collected blood is centrifuged to remove a leucocyte layer.

(3) A method wherein a filter for removing leucocytes is used.

In the methods (1) and (2), leucocytes are removed utilizing the difference in the specific gravity between leucocytes and platelets. However, it is difficult to efficiently remove only leucocytes because the difference in the specific gravity between leucocytes and platelets is small.

In the method (3), concentrated platelets or platelet-rich plasma is filtrated through a filter wherein a fleece or a nonwoven fabric made of an extra fine fiber is filled into a housing. This method is widely available because a high removal rate of leucocytes can be attained with an easy operation. In this case, a filter comprising a filter medium using a fleece of a cotton, a regenerated cellulose or a cellulose acetate is not preferable because of the following reason. The diameter of monofilament of such material is large and therefore a large volume is required for a housing in which a required amount of the fiber is filled. An amount of residual platelets in the housing after filtration becomes large when the large volume housing is used. Therefore, a nonwoven fabric made of an extra fine fiber such as a polyester, whose character as a fiber medium is improved, is used. That is, the nonwoven fabric made of an extra fine fiber can save a volume of a housing, and realizes a high removal rate of leucocytes with lower loss of platelets.

In the method (3), however, there are defects that platelets are lost when a quantity of blood to be filtrated is small and that the removal rate of leucocytes lowers when blood is stored for a long period.

An objects of the present invention is to provide a filter for removing leucocytes which removes leucocytes efficiently from concentrated platelets or platelet-rich plasma without loss of platelets, solving the above mentioned problems.

This and the other objects of the present invention will become apparent from the description hereinafter.

SUMMARY OF THE INVENTION

It has now been found that a polyester nonwoven fabric coated or grafted with a glucosyloxyethyl methacrylate copolymer is useful to remove leucocytes from concentrated platelets or platelet-rich plasma because the surface of the fabric has both of hydrophilicity and hydrophobicity adequately.

In accordance with the present invention there is provided a filter for removing leucocytes comprising a filter medium, said filter medium being a fibrous material made of a polyester fiber which is treated on its surface with a copolymer containing 40 to 80% by weight of units derived from glucosyloxyethyl methacrylate.

when leucocytes are removed from concentrated platelets or platelet-rich plasma with using the filter for removing leucocytes of the present invention, the loss of platelets is advantageously lowered.

DETAILED DESCRIPTION

The copolymer containing 40 to 80% by weight of units derived from glucosyloxyethyl methacrylate and other (vinyl) monomers copolymerized therewith is used in the present invention. When the amounts of the units is less than 40% by weight, the loss of platelets tends to increase. When the amount of the units is more than 80% by weight, the removal rate of leucocytes tends to lower.

Glucosyloxyethyl methacrylate is synthesized by direct coupling of 2-hydroxyethyl methacrylate with some aldoses such as glucose, galactose, mannose and xylose.

Examples of the other copolymerizable monomers are, for instance, acrylic acid, methacrylic acid, an alkyl acrylate and an alkyl methacrylate such as methyl methacrylate, hydroxyethyl methacrylate, and the like.

The glucosyloxyethyl methacrylate copolymer in the present invention can be obtained according to a usual process for copolymerization such as bulk polymerization, solution polymerization, suspension polymerization, emulsion polymerization and radiation polymerization using the above mentioned monomers.

As a polyester fiber usable in the present invention, there are, for example, polyethylene terephthalate and the like.

In the present invention, the diameter of a polyester fiber is 1 to 10 μm. When the diameter is less than 1 μm, it becomes difficult to prepare a filter medium because the strength of the fiber is too small. When the diameter is more than 10 μm, the removal rate of leucocytes lowers because the filtration capacity lowers due to the small surface area of the fiber.

As a fibrous material in the present invention, there are, for example, a nonwoven fabric, a fleece and the like made of a polyester fiber. Such material can be prepared according to a usual process from a polyester fiber.

In the present invention, the fibrous material made of a polyester fiber is treated on its surface with the glucosyloxyethyl methacrylate copolymer to give a filter medium. In the fibrous material, the amount of the copolymer is 0.5 to 30% by weight on the basis of the total weight of the surface-treated fibrous material. When the amount of the copolymer is less than 0.5% by weight, a considerable amount of platelets are lost by adsorption during the filtration. When the amount of the copolymer is more than 30% by weight, the removal rate of leucocytes lowers.

The surface treatment of the fibrous material made of a polyester fiber may be applied to either the fibrous material or the polyester fiber before the formation of the fibrous material.

The surface treatment of the fibrous material or the polyester fiber is carried out according to a usual process such as coating or graft polymerization.

In the present invention, a polyester fiber is preferably employed because it is generally used as a material of a blood filter or an artificial organ, excellent and stable in mechanical properties. However, there can be used other materials which are non-toxic and inactive against blood, excellent and stable in mechanical properties.

The above-mentioned filter medium is placed in a suitable housing such as a column, or a container having an inlet and an outlet. The filter medium can be filled in the housing by stacking to form layers or packing so that the apparent density in the housing is from 0.1 to 0.3 g/cm$^3$.

The present invention is more specifically described and explained by means of the following Examples and Comparative Examples in which all percents are by weight unless otherwise noted. It is to be understood that the present invention is not limited to the Examples, and various changes and modifications may be made in the invention without departing from the spirit and scope thereof.

In the following Examples, a removal rate of leucocytes and a recovery of platelets were evaluated when a filter for removing leucocytes of the present invention was used.

The removal rate of leucocytes and the recovery of platelets were calculated according to the following arithmetic expressions.

Removal rate (%) of leucocytes =
{1-(number of leucocytes after filtration/ number of leucocytes before filtration} × 100

Recovery (%) of platelets =
(number of platelets after filtration/ (number of platelets before filtration) × 100

EXAMPLE 1

In a vessel were mixed 240 g of glucosyloxyethyl methacrylate, 160 g of methyl methacrylate, 650 g of isopropanol and 350 g of water.

To the obtained mixture was added 30 g of azoisobutylnitrile (AIBN) and then the mixture was stirred in an atmosphere of nitrogen at 70° C. for 4 hours to carry out the polymerizing reaction. Thus a copolymer was obtained.

In order to examine the composition of the copolymer the sugar part at the side chain was hydrolyzed and then the amount of the sugar was determined by phenol-sulfuric acid method. The content of the units derived from glucosyloxyethyl methacrylate was found to be 60%.

The obtained copolymer (5 g) was dissolved in a mixed solvent (95 g) of isopropyl alcohol and water in a ratio of 65:35 by weight. Into the obtained solution was immersed a nonwoven fabric (10 g) made of a polyester fiber (polyethylene terephthalete) having the fiber diameter of 3.5 μm, followed by forced-air drying at 100° C. for 1 hour. After the drying, the increased weight of the nonwoven fabric was measured and the amount of the copolymer coated was found to be 8% on the basis of the total weight of the surface-treated nonwoven fabric.

A housing whose volume was 10 ml was filled with 1 g of thus obtained nonwoven fabric to give a filter for removing leucocytes.

Through the filter for removing leucocytes was filtrated on gravity 200 ml of concentrated platelets by introducing thereto the platelets placed over the filter top at a height of 1 m.

The numbers of leucocytes and platelets were measured with respect to concentrated platelets before and after the filtration. The removal rate of leucocytes and the recovery of platelets were found to be 99% and 95%, respectively.

EXAMPLE 2

A housing whose volume was 5 ml was filled with 0.5 g of a surface-treated nonwoven fabric made of a polyester fiber having the fiber diameter of 3.5 μm, which fabric was treated in the same condition as in Example 1, to give a filter for removing leucocytes.

Through the filter for removing leucocytes was filtrated on gravity 100 ml of concentrated platelets by introducing thereto the platelets placed over the filter top at a height of 1 m.

The numbers of leucocytes and platelets were measured with respect to concentrated platelets before and after the filtration. The removal rate of leucocytes and the recovery of platelets were found to be 99% and 93%, respectively.

COMPARATIVE EXAMPLE 1

The procedure of Example 1 was repeated except that the degree of squeezing of the immersed nonwoven fabric was changed so that the amount of the copolymer coated was 0.2% on the basis of the total weight of the surface-treated nonwoven fabric.

A housing whose volume was 5 ml was filled with 0.5 g of the obtained nonwoven fabric to give a filter for removing leucocytes.

Through the filter for removing leucocytes was filtrated on gravity 100 ml of concentrated platelets by introducing thereto the platelets placed over the filter top at a height of 1 m.

The numbers of leucocytes and platelets were measured with respect to concentrated platelets before and after the filtration. The removal rate of leucocytes and the recovery of platelets were found to be 99% and 78%, respectively.

EXAMPLE 3

In a vessel were mixed 160 g of glucosyloxyethyl methacrylate, 240 g of methyl methacrylate, 550 g of isopropanol, 650 g of dioxane and 250 g of water.

Using the obtained mixture, the polymerizing reaction was carried out in the same condition as in Example 1 to give a copolymer.

The composition of the copolymer was examined in the same way as in Example 1. The content of the units derived from glucosyloxyethyl methacylate was found to be 40%.

The obtained copolymer (10 g) was dissolved with a mixed solvent (90 g) of isopropyl alcohol, dioxane and water in a ratio of 35:45:20 by weight. Into the obtained solution was immersed a nonwoven fabric (10 g) made of a polyester fiber (polyethylene terephthalete) having the fiber diameter of 3.5 μm, followed by forced-air drying at 100° C. for 1 hour. After the drying, the increased weight of the nonwoven fabric was measured and the amount of the copolymer coated was found to be 12% on the basis of the total weight of the surface-treated nonwoven fabric.

A housing whose volume was 5 ml was filled with 0.5 g of thus obtained nonwoven fabric to give a filter for removing leucocytes.

Through the filter for removing leucocytes was filtrated on gravity 100 ml of concentrated platelets by introducing thereto the platelets placed over the filter top at a height of 1 m.

The numbers of leucocytes and platelets were measured with respect to concentrated platelets before and after the filtration. The removal rate of leucocytes and the recovery of platelets were found to be 99% and 92%, respectively.

COMPARATIVE EXAMPLE 2

The procedure of Example 3 was repeated except that the degree of squeezing of the immersed nonwoven fabric was changed so that the amount of the copolymer coated was 38% on the basis of total weight of the surface-treated nonwoven fabric.

A housing whose volume was 5 ml was filled with 0.5 g of the obtained nonwoven fabric to give a filter for removing leucocytes.

Through the filter for removing leucocytes was filtrated on gravity 100 ml of concentrated platelets by introducing thereto the platelets placed over the filter top at a height of 1 m.

The numbers of leucocytes and platelets were measured with respect to concentrated platelets before and after the filtration. The removal rate of leucocytes and the recovery of platelets were found to be 70% and 90%, respectively.

In addition to the ingredients used in the Examples, other ingredients can be used in the Examples as set forth in the specification to obtain substantially the same results.

What we claim is:

1. A filter for removing leucocytes comprising a filter medium, said filter medium being a fibrous material made of a polyester fiber which is treated on its surface with a copolymer containing 40 to 80% by weight of units derived from glucosyloxyethyl methacrylate.

2. The filter of claim 1, wherein the diameter of said polyester fiber is 1 to 10 μm.

3. The filter of claim 1, wherein the amount of said copolymer is 0.5 to 30% by weight on the basis of the total weight of said surface-treated fibrous material.

* * * * *